United States Patent

Hightower et al.

(10) Patent No.: US 9,243,925 B2
(45) Date of Patent: Jan. 26, 2016

(54) GENERATING A SEQUENCE OF LANE-SPECIFIC DRIVING DIRECTIONS

(71) Applicant: GOOGLE INC., Mountain View, CA (US)

(72) Inventors: Jeffrey Richard Hightower, Bothell, WA (US); William Henry Steinmetz, Seattle, WA (US)

(73) Assignee: GOOGLE INC., Mountain View, CA (US)

( * ) Notice: Subject to any disclaimer, the term of this patent is extended or adjusted under 35 U.S.C. 154(b) by 134 days.

(21) Appl. No.: 14/010,965

(22) Filed: Aug. 27, 2013

(65) Prior Publication Data

US 2015/0185026 A1 Jul. 2, 2015

(51) Int. Cl.
*G01C 21/34* (2006.01)
*G01C 21/36* (2006.01)

(52) U.S. Cl.
CPC ................. *G01C 21/3658* (2013.01)

(58) Field of Classification Search
CPC ......... G01C 21/34; G01C 21/36; G08G 1/123
USPC .................. 701/408, 409, 437, 533
See application file for complete search history.

(56) References Cited

U.S. PATENT DOCUMENTS

| 2001/0013837 | A1 | 8/2001 | Yamashita et al. |
| 2005/0004753 | A1* | 1/2005 | Weiland et al. ............... 701/208 |
| 2009/0326814 | A1 | 12/2009 | Harumoto et al. |
| 2010/0253542 | A1* | 10/2010 | Seder et al. ............... 340/932.2 |

OTHER PUBLICATIONS

Betaille et al., "Creating Enhanced Maps for Lane-Level Vehicle Navigation," IEEE Transactions on Intelligent Transportation Systems, 11 (4):786-798 (2010).
Toledo-Moreo et al., "Lane-Level Integrity Provision for Navigation and Map Matching with GNSS, Dead Reckoning, and Enhanced Maps," IEEE Transactions on Intelligent Transportation Systems (2009).
Toledo-Moreo et al., "Road Vehicle Positioning at the Lane Level Based on GNSS Integration with Enhanced Maps," The 16th Intelligent Transportation Systems World Congress (2009).

* cited by examiner

*Primary Examiner* — Richard Camby
(74) *Attorney, Agent, or Firm* — Marshall, Gerstein & Borun LLP

(57) ABSTRACT

Lane-specific driving directions are generated using route data that describes a route between an origin and a destination as a sequence of route segments, and lane data for at least several route segments included in the sequence of route segments. The sequence of route segments includes a pair of adjacent multi-lane route segments that includes a first multi-lane route segment more proximate to the destination and a second multi-lane route segment more proximate to the origin, connected at a road junction. To determine a recommended lane connection at the road junction, a lane in the first multi-lane route segment is selected, and a lane in the second multi-lane route segment is selected based on the lane selected in the first multi-lane segment.

20 Claims, 5 Drawing Sheets

US 9,243,925 B2

GENERATING A SEQUENCE OF LANE-SPECIFIC DRIVING DIRECTIONS

FIELD OF THE DISCLOSURE

The present disclosure relates to computer-generated driving directions and, more particularly, to efficiently generating lane-specific driving directions for presentation via a user interface of an electronic device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, a wide variety of computing devices, including many portable devices, support software applications that generate driving directions for navigating streets and roads ("navigation applications"). For example, navigation applications may run on laptop and tablet computers, mobile phones, car navigation systems, hand-held global positioning system (GPS) units, etc. In addition to generating driving directions, many of these devices may also support mapping applications that provide interactive digital maps of a geographic area corresponding to roads and locations described in the driving directions.

In general, navigation applications provide driving directions as sequence of instructions that describes a driving route between a starting location and a destination location. For example, an instruction can be "Turn right on First St." or "Take exit 19 toward Third St." Yet even if the driver follows these directions, it still may be difficult sometimes to legally and safely change lanes at different stages of the driving route. For instance, the driver may only have a limited amount of time, and a limited opportunity due to traffic or weather, to make a lane change before executing a maneuver suggested by the driving directions.

SUMMARY

The techniques of the present disclosure can be implemented as a method for generating lane-specific driving directions. The method includes receiving, by one or more processors, route data describing a route between an origin and a destination as a sequence of route segments. The method further includes receiving lane data for at least several route segments included in the sequence of route segments, where the sequence of route segments includes a pair of adjacent multi-lane route segments including a first multi-lane route segment more proximate to the destination and a second multi-lane route segment more proximate to the origin, connected at a road junction. Still further, the method includes selecting, by one or more processors, a lane in the first multi-lane route segment and selecting, by the one or more processors, a lane in the second multi-lane route segment based on the lane selected in the first multi-lane segment to determine a recommended lane connection at the road junction.

Another embodiment of the techniques described in the present disclosure is a method for evaluating lanes in multi-lane segments of routes described by driving directions. The method includes receiving a description of a route between an origin and a destination, where the route specifies a sequence of route segments connected at road junctions; receiving lane data for a multi-lane route segment included in the sequence of route segments, where the lane data indicates available lane connections for each of a set of lanes of the multi-lane route segment; and generating, by one or more processors, a respective grade for each of the set of lanes based on the description of the route and the lane data. Generating the grades includes generating (i) a recommended grade for a first lane, (ii) an on-route grade to a second lane, and (iii) an off-route grade to a third lane.

Another embodiment of the techniques discussed below is a method for providing lane-specific driving directions via a user interface of a computing device. The method includes receiving route data describing a route between an origin and a destination as a sequence of route segments connected at road junctions and receiving indications of grades assigned to lanes in multi-lane route segments included in the sequence. Receiving the indications of grades includes receiving (i) a recommended grade assigned to a first lane, (ii) an on-route grade assigned to a second lane, and (iii) an off-route grade assigned to a third lane. The method also includes providing lane-specific driving directions including indications of route segments and the indications of grades via the user interface.

Still another embodiment of the techniques discussed below is a method for evaluating lane connections for multi-lane segments of routes to provide lane-specific driving directions. The method includes receiving a description of a route between an origin and a destination, where the route includes a sequence of route segments connected at road junctions. The method also includes receiving road junction data for one of the road junctions at which a multi-lane route segment is connected to two or more roads, where the road junction data indicates several lane connections between lanes of the multi-lane route segment and the two or more roads. The method further includes generating, by the one or more processors, a respective grade for each of the lane connections based on the description of the route and the road junction data, including generating (i) a recommended grade for a first lane connection, (ii) an on-route grade to a second lane connection, and (iii) an off-route grade to a third lane connection.

DETAILED DESCRIPTION

Generally speaking, a navigation software operating on a server and/or a client device generates lane-specific driving directions for guiding a user from a source to a destination. The driving directions specify a route made up of route segments interconnected at road junctions. When the navigation software determines that the user can be in one of several lanes in a multi-lane route segment to stay on route, the navigation software determines which of these lanes is preferable so as to better prepare the user for subsequent maneuvers. For example, the driving directions can include an instruction to make a left turn at the next intersection that also specifies that the leftmost lane is the recommended (or "preferred") lane, the second lane from the left is an on-route lane that is not preferred, and the third lane is an off-route lane. The navigation application thus assigns one of at least three grades to a lane. As discussed in more detail below, the navigation service can grade lanes in view of the subsequent route segment on the way of the destination, and generate lane-specific driving directions by traversing the route backward from the destination to the origin.

The navigation software also can assign grades to lane junctions, or turns and other maneuvers available at road junctions between pairs of lanes. Thus, for example, a lane from which the driver can turn right or continue to drive straight can have an on-route lane connection as well as an off-route connection. The on-route lane connection in some cases also may be recommended.

These techniques are discussed in more detail below with reference to FIGS. 1-7. In particular, an example system in which navigation software provides lane-specific driving directions is described with reference to FIG. 1, an example road map and corresponding lane-specific driving directions are discussed with reference to FIG. 2, several example road junctions are described with reference to FIGS. 3-5, and example methods which the navigation software may implement to provide a user with lane-specific driving directions are discussed with reference to FIGS. 6 and 7.

System Overview

Figure 1:
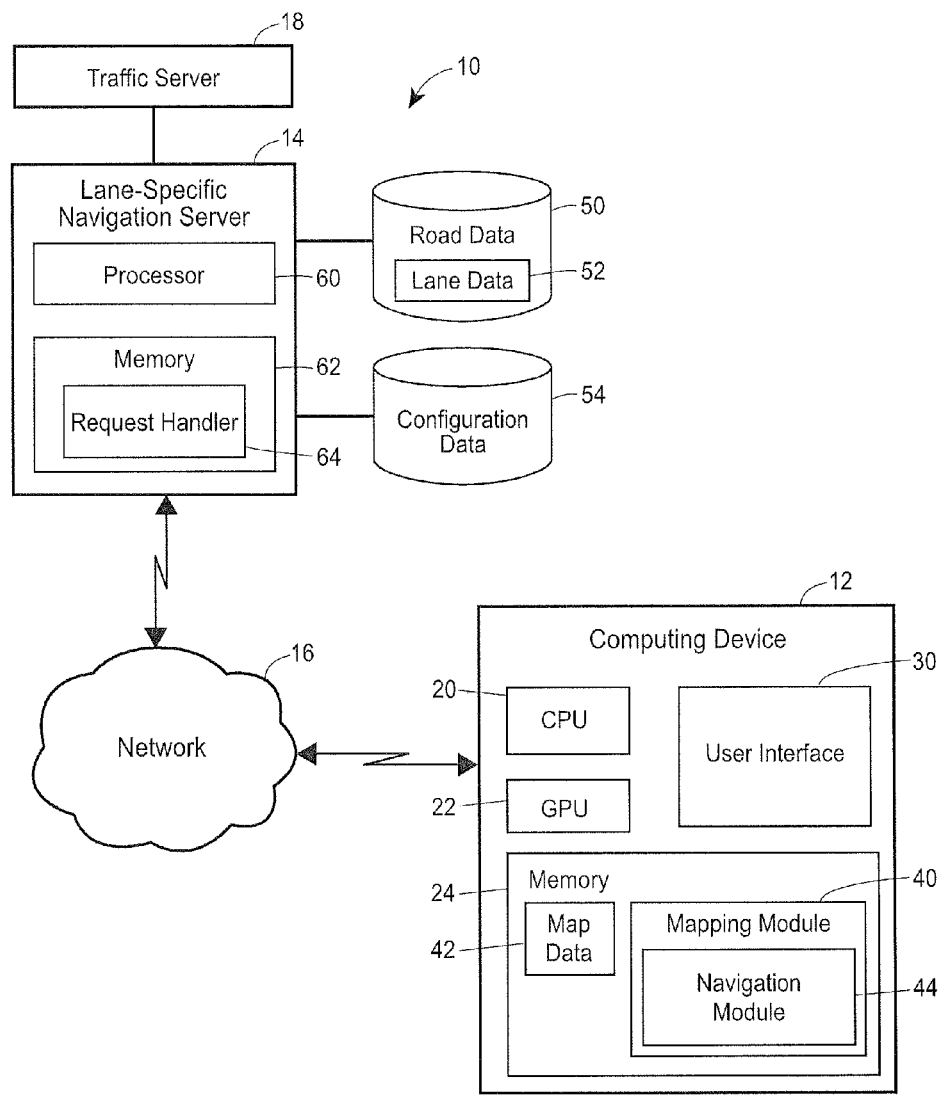
FIG. 1 is a block diagram of an example system in which techniques for generating lane-specific driving directions in a navigation application are implemented.

Referring first to FIG. 1, a system 10 includes a computing device 12 coupled to a lane-specific navigation server 14 via a communication network 16. The computing device 12 can be, for example, a laptop computer, a tablet computer, a smartphone, car navigation system, etc. In the embodiment illustrated in FIG. 1, the computing device 12 includes a central processing unit (CPU) 20, a graphics processing unit (GPU) 22, a computer-readable memory 24, and a user interface 30. Types of user interfaces 30 may include input devices such as a keyboard, a mouse, a touchscreen, a microphone, etc. as well as output devices such as a touchscreen or a regular display, speakers, etc. The memory 24 is a computer-readable non-transitory storage device that may include both persistent (e.g., a hard disk) and non-persistent (e.g., RAM) memory components. The memory 24 stores instructions executable on the CPU 20 and/or the GPU 22 that make up a mapping software module 40 and map data 42 on which the mapping module 40 operates.

For simplicity, FIG. 1 does not depict a separate map server that provides map data to the computing device 12. It will be understood, however, that the mapping software module 40 can generate requests for map data for certain geographic regions and certain zoom levels, transmit these requests to a map server operating in the system 10, and receive in response map data that includes vector data, raster images, text labels, etc. The mapping software module 40 then can render the received map data and display digital maps via the user interface 30. Alternatively, the navigation server 14 can provide map along with driving directions to the computing device 12.

The mapping software module 40 according to various implementations operates as a separately executable software application, a plugin that extends the functionality of another software application such as a web browser, an application programming interface (API) invokable by a software application, etc. The instructions that make up the mapping software module 40 may be compiled and executable on the CPU 20 and/or the GPU 22 directly, or not compiled and interpreted by the CPU 20 at runtime. Further, the navigation module 44 may be provided as an integral part of the mapping software module 40 or as a separately installable and downloadable component.

Navigation software that generates lane-specific driving directions can operate on the computing device 12, the navigation server 14, or both. In the example of FIG. 1, the navigation server 14 generates lane-specific driving directions, and a navigation module 44 operating the mapping module 40 provides the lane-specific driving directions to the user in the form text, icons and other images, audio announcements, etc. To generate lane-specific driving directions, the the navigation server 14 retrieves road data and lane data from a road database 50 and a lane database 52, respectively.

Road data may specify individual road segments, road junctions, connections between the road segments and the road junctions, and the corresponding geographic coordinates. Moreover, the road data may also define the length, travel speed, etc. of each road segment and the type of each road junction, such as a T-junction, a Y-junction, a yield junction, a lane merger junction, an acute angle junction, a staggered junction, etc. Road data also may include text-based data for displaying various labels such as street names or names of landmarks.

Lane data may specify the number of lanes in a road segment, legal lane connections (connecting two particular lanes of different road segments) at a road junction, legal restrictions of particular lanes (e.g., left-turn-only, carpool-only), lane dimensions (e.g., for large trucks or oversized loads), the turn radius of a junction at which lanes from two segments connect, and other data pertaining to lanes and connections between lanes. Lane data also may include text for labeling lanes or a landmarks associated with particular lanes.

In an example scenario, a user operating the computing device submits a request for driving directions via the user interface of the navigation module 44. The request can specify an origin, which can be the current location, and a destination. The navigation module 44 requests driving directions from the navigation server 14, which uses road data and lane data to generate lane-specific driving directions. The navigation server 14 transmits the lane-specific driving directions to the navigation module 44 in any suitable agreed-upon format.

For example, to reduce bandwidth requirement, the navigation server 14 and the navigation module 44 can support a protocol in which each turn type, each lane type, each lane connection type, etc. is specified using a corresponding constant, so as to provide navigation data to the client device 12 quickly and efficiently. The navigation module 44 then can expand the compact description of the navigation directions to user-friendly instructions (e.g., "Make a slight right onto State St."), generate icons to graphically illustrate the maneuvers, generate audio announcement, etc.

In an alternative implementation, the navigation server 14 provides "raw" road and lane data to the computing device 12 for generating lane-specific driving directions on the computing device 12.

With continued reference to FIG. 1, the navigation server 14 can include a processor 60 and a memory 62 that stores a request handler 64, made up of instructions executable on the processor 60. During operation, the request handler 64 can receive and process requests for driving directions from client devices such as the computing device 12. The navigation server 14 also may be communicatively coupled to a traffic server 18 to obtain traffic data for the relevant road segments. The traffic server 18 may indicate, for example, travel times for road segments as well as reports of congestion, car accidents, road construction, etc. The navigation server 14 can utilize this traffic data to generate efficient routes. According to some implementations, the navigation module 44 also utilizes this data to provide more robust directions (e.g., "Left lane closed ahead: merge right!").

For simplicity, FIG. 1 illustrates the lane-specific navigation server 14 as only one instance of a server device. However, the lane-specific navigation server 14 according to some implementations includes in a group of one or more lane-specific navigation server devices, each equipped with one or more processors and capable of operating independently of the other lane-specific navigation server devices. Lane-specific navigation server devices operating in such a group can process requests from the computing device 12 individually (e.g., based on availability), in a distributed manner where one operation associated with processing a request is performed on one map server device while another operation associated with processing the same request is performed on another lane-specific navigation server device, or according to any other suitable technique. For the purposes of this discussion, the term "lane-specific navigation server" may refer to an individual lane-specific navigation server device or to a group of two or more lane-specific navigation server devices.

Example Lane-specific Driving Directions

Figure 2:
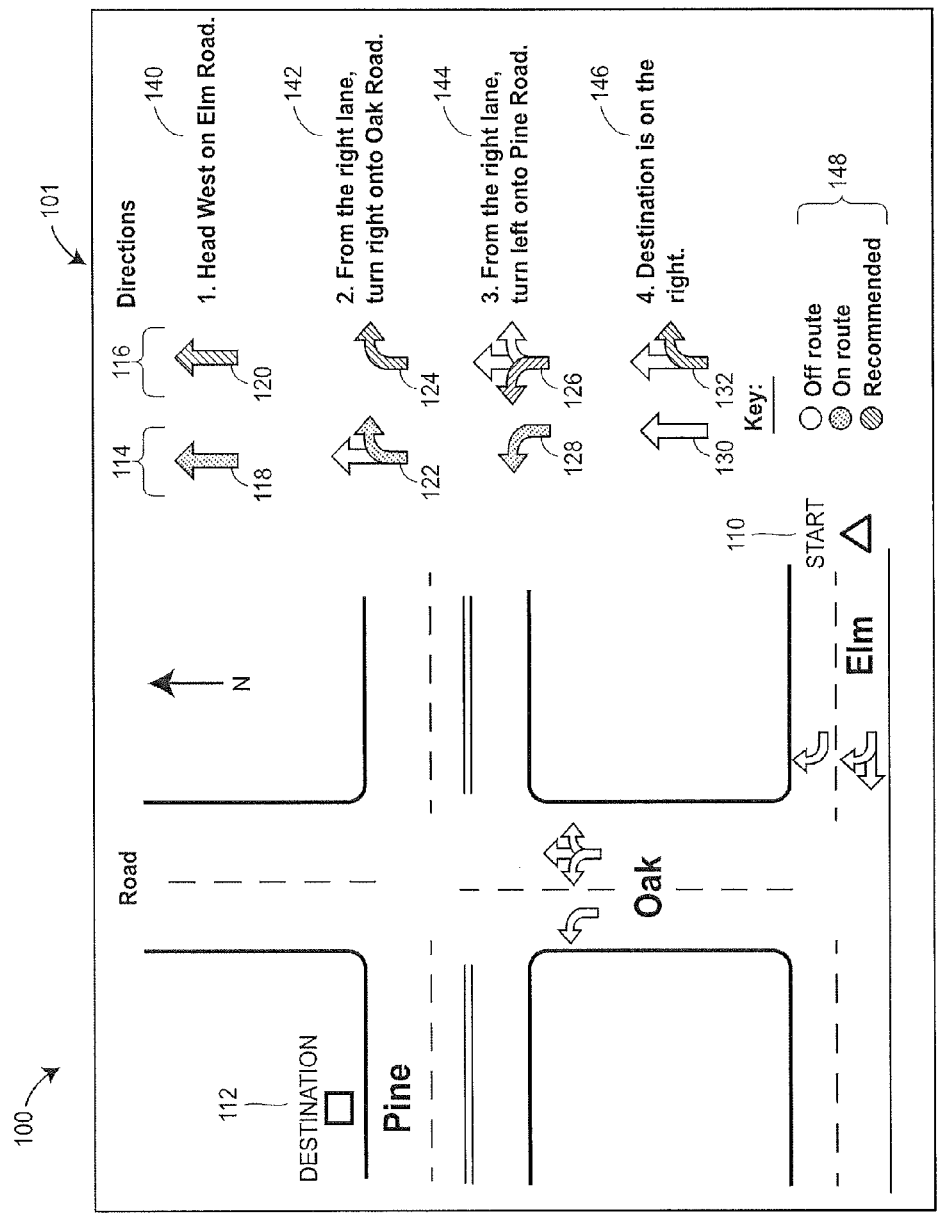
FIG. 2 is an example road map and an example screenshot that illustrates lane-specific driving directions from a starting location to a destination location that correspond to the example road map.

Now referring to FIG. 2, an example road map 100 illustrates the layout of several roads and road intersections within a geographic area, and an example screenshot 101 displays lane-specific driving directions 140-146 from a starting location 110 (or simply "origin") to a destination location ("the destination") 112 that correspond to the example road map 100. Navigation software can generate the driving directions 140-146 to safely guide a driver to the destination 112. In an example scenario, the navigation server 14 generates the directions 140-146, and the navigation module 44 displays these directions via a user interface, along with the corresponding left lane symbols 114, right lane symbols 116, other lane symbols (not shown) and, if desired, the road map 100.

In this example, the road map 100 illustrates three roads, Elm Road ("Elm"), Oak Road ("Oak"), and Pine Road ("Pine"), and two corresponding intersections (e.g., Elm/Oak and Oak/Pine) of the three roads. As shown in the example road map 100, Elm and Oak are one-way roads that include two lanes each, and Pine is a two-way road with two lanes available for westbound traffic and one lane available for eastbound traffic. The destination 112 is situated on the right (or north) side of Pine and may only be accessed by a driver from the right lane of the westbound lanes. The navigation software can determine the origin 110 from user input provided via the user interface 30, from a GPS unit, assisted GPS ("A-GPS") module, etc. that geolocates the geographic location of the computing device 12 of FIG. 1, or in any other suitable manner. The navigation software can determine the destination 112 from another user-specified input via the user interface 30, from another local or remote software application or computing device, etc.

The screenshot 101 illustrates the corresponding lane-specific driving directions 140-146 for a driver to safely reach and easily access the destination location 112 from the starting location 110. Each step of the driving directions 140-146 can include a textual description of the maneuver to be executed (or a confirmation that the driver should not maneuver to stay on route). Additionally or alternatively, each step can be represented by the lane symbols 114 and 116. More generally, lane-specific directions can be provided using any suitable presentation technique, such as by displaying text, images, or animation, playing back audio announcements, and generating vibrations (which may be applied to bicycle or motorcycle handles).

In the example of FIG. 2, the lane symbols 114 and 116 are color-coded to indicate whether recommended lane connections, on-route lane connections, and off-route lane connections are available in the corresponding lanes. Different colors are represented in FIG. 2 using different shading. These colors or shades reflect the grades assigned to lane and/or lane connections, with "recommended" being the highest grade, "on-route" being an intermediate grade, and "off-route" being the lowest grade. The navigation software generates a legend 148 to explain to the colors how the lane symbols are to be interpreted.

Because each of the relevant road segments in FIG. 2 includes exactly two lanes in the direction of travel, the screenshot 101 depicts two columns of lane symbols, one for the left lane and one for the right lane. In at least some of the implementations, each step of the driving directions can be represented, or accompanied, by as many lane symbols as there are lanes in the road segment along the relevant direction of travel. When lane data is unavailable for a certain road segment, the navigation software module can generate a different symbol or, if preferred, no symbol at all.

According to the directions of FIG. 2, to arrive at the destination 112, a driver can begin to drive west on Elm (step 140). Lane symbol 118 indicates that the left lane is on route. However, lane symbol 120 indicates that the right lane is not only on route but also recommended. The lane symbols 118 and 120 also can be regarded as also describing trivial lane connections.

The next step 142 includes a textual instruction to turn right onto Oak from the right lane. Accordingly, lane symbol 124 indicates that a preferred lane connection is available in the right lane, and that the lane connection corresponds to a right turn. Lane symbol 122 indicates that an on-route lane connection as well as an off-route lane connection are available in the left lane. The maneuvers corresponding to the on-route lane connection and the off-route lane connection are right turn and straight, respectively.

With continued reference to FIG. 2, step 144 includes a textual instruction to turn left onto Pine from the right lane. Lane symbol 128 indicates the driver can make a left turn from the left lane to make an on-route lane connection. Lane symbol 126 indicates that the driver can make a right from the right lane to make an off-route lane connection, go straight in the right lane to make another off-route lane connection, or make left to make an an-route lane connection that is also recommended.

Finally, the text corresponding to step 146 indicates that the destination will be on the driver's right. Lane symbol 130 indicates that the left lane is off-route. Lane symbol 132 indicates that turning right from the right lane is equivalent to making a recommended lane connection, and that going straight in the right lane is equivalent to making an off-route lane connection.

It is noted that if the driver turns onto Pine from the left lane of Oak, the driver has to quickly switch lanes upon completing the turn to reach the destination. Further, if the driver turns right onto Oak from the left lane of Elm, the driver ends up in the left lane of Oak. The driver then has to quickly switch to the right lane or turn onto Pine from the left lane, which is undesirable for the reason mentioned above. On the other hand, by following the lane-specific direction 140-146, the driver does not make unnecessary lane switches and is in the correct lane immediately before reaching the destination.

Although the example road map 100 of FIG. 2 illustrates only one four-way intersection and one three-way intersection, the navigation module 44 may process any type of road junction residing within a road map in generating lane-specific driving directions. In general, a road junction is designed to allow vehicular traffic to move in different directions from one road segment to another road segment in a systematic manner and may include the intersecting of two or more roads. Example road junction types may include a T-junction, a Y-junction, an acute angle junction, a staggered junction, a multiple road junction, or any other type of road junction joining multiple roads. For example, a T-junction generally is the intersection of three road segments that join at 90 or 180 degrees from each other (e.g., the intersection of Elm and Oak as shown in FIG. 2.) Another example road junctions may also include a yield junction that generally requires a driver to yield to or from thoroughfare traffic and occurs most often at the junction of a highway and a highway on ramp or highway off ramp, for instance.

Figure 3:
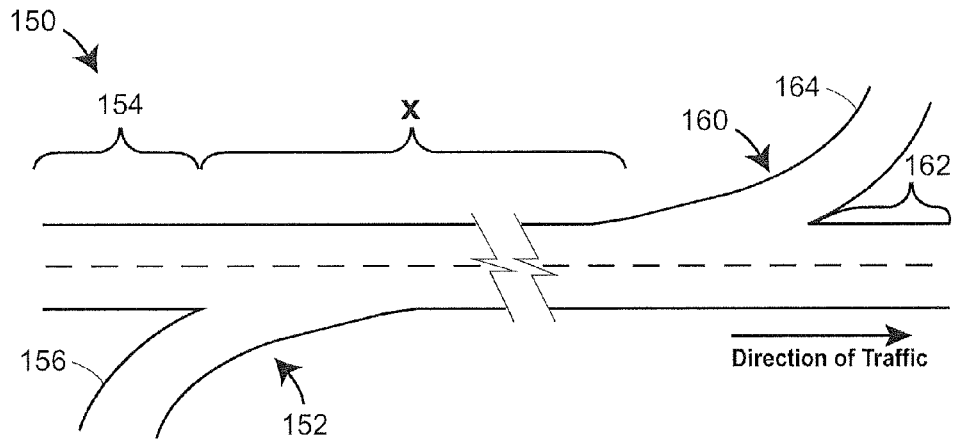
FIG. 3 is an example road map that illustrates two road junctions of different types that are situated on opposite sides of a highway.

As illustrated in FIG. 3, a fragment of a road map 150 illustrates a section of a highway that includes two example junctions 152 and 160. The highway on-ramp junction 152 joins three road segments: a highway segment 154, a highway segment x, and a highway on-ramp segment 156. The highway off-ramp junction 160 joins three segments: the highway segment x, a highway segment 162, and a highway off-ramp segment 164. As shown in the example road map 150 of FIG. 3, the left lane of the highway provides the best access to the highway off-ramp junction 160.

Figure 4:
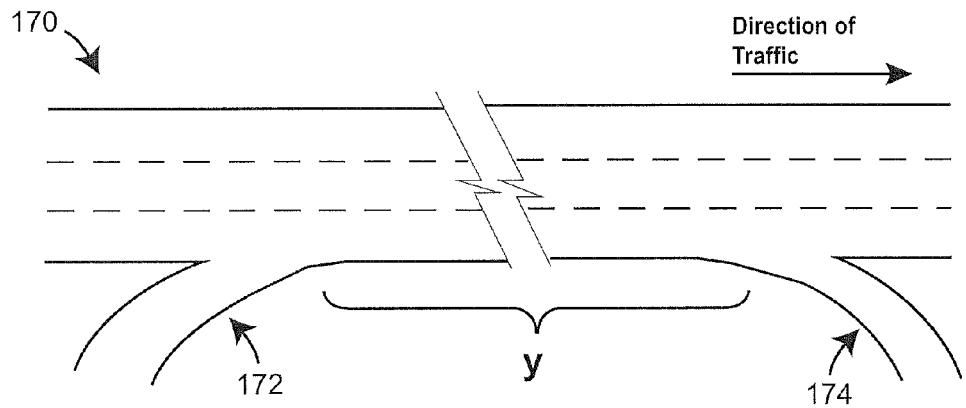
FIG. 4 is an example road map that illustrates two road junctions of different types that are situated on the same side of a highway.

Similarly, FIG. 4 illustrates another example road map 170 that includes another two example junctions: a highway on ramp junction 172 and a highway off ramp junction 174 that are separated by a road segment y. However, the highway off-ramp junction 174 provides best access to the off-ramp from the right lane of the highway (in contrast to the left lane of the highway of FIG. 3). As will be discussed below with reference to FIG. 7, the location of a particular road junction relative to a highway may be at least one variable used in generating the lane-specific driving directions.

Figure 5:
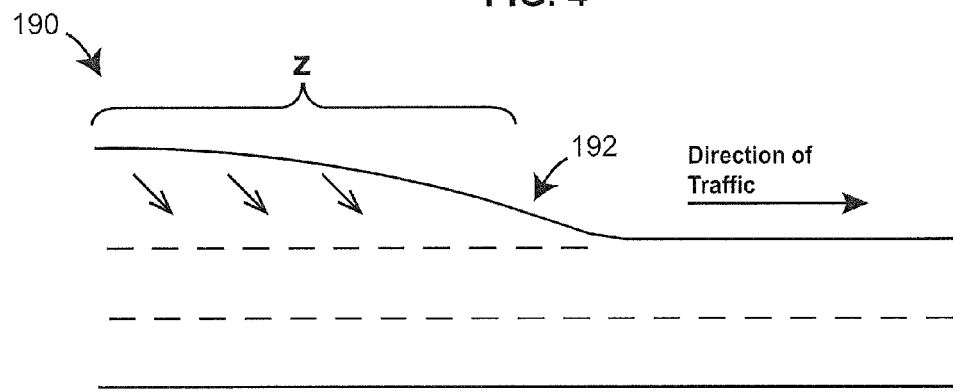
FIG. 5 is an example road map that illustrates another type of road junction.

FIG. 5 illustrates yet another example road map 190 that includes merger road junction 192. The merger road junction 192, as shown in FIG. 5, requires a driver in the far left lane of the highway to merge into one of the other lanes of the highway to right. Depending on the length of distance of the ending left lane (e.g., a road segment z), the driver may need to merge to the right quickly if the distance z is short or may have ample time to merge if the distance z is sufficiently long. As will be discussed below with reference to FIG. 7, the length or distance of a particular road segment may be another variable used in generating lane-specific driving directions.
Example Algorithm for Generating Lane-specific Directions and Grading Lanes/Lane Connections To further illustrate the techniques for generating lane-specific driving directions between an origin and a destination, example methods that the navigation module 44 may implement are discussed next with reference to FIGS. 6 and 7. More generally, these methods can be implemented in any suitable computing device or a group of devices and any suitable software application. In at least some of these implementations, the techniques for generating lane-specific driving directions can be implemented as sets of instructions stored on a computer-readable medium and executable on one or more processors.

Figure 6:
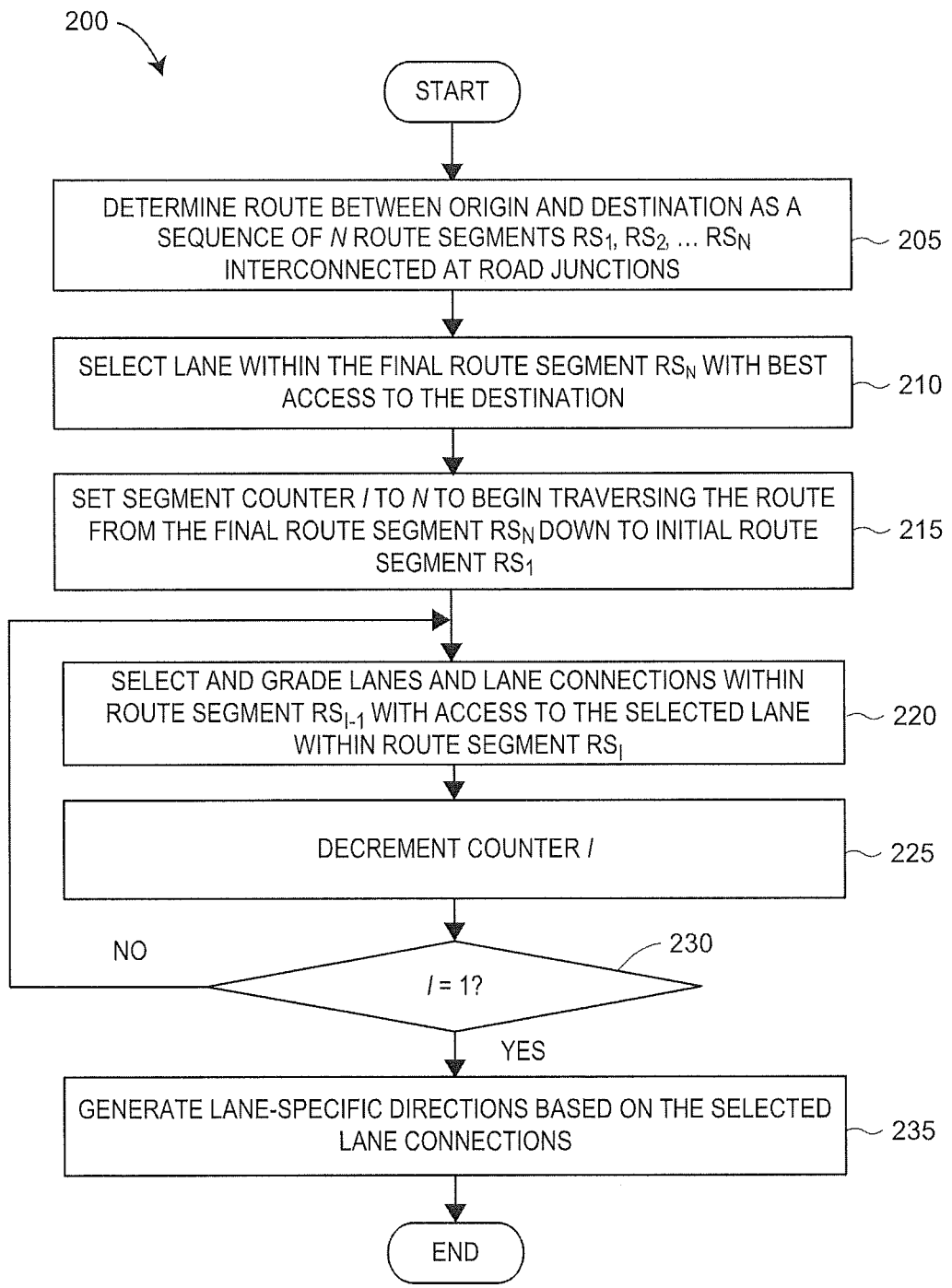
FIG. 6 is a flow diagram of an example method for generating lane-specific driving directions for a driving route between a starting location and a destination location.

The flow diagram of FIG. 6 illustrates an example method 200 for generating lane-specific driving directions between an origin (or a starting point) and a destination. According to this method, a set of recommended lanes and lane connections are selected so as to best prepare the driver for turns and other maneuvers, and to eliminate unnecessary lane changes. The method 200 in a sense generates a lane-specific path within the route to the destination.

At a block 205, a driving route between the origin and the destination is determined. The route may be determined at the lane-specific navigation server 14 (as shown in FIG. 1) or at the computing device 12 using road data, for example. To this end, any suitable technique for generating a driving route based on road data can be used. The route can include a sequence of N route segments (e.g., $RS_1, RS_2, \ldots RS_N$) that are interconnected at road junctions. Referring back to FIG. 2, for example, the route generated at block 205 can be made up of the following set of instructions: "(1) straight on Elm, (2) right on Oak, (3) left on Pine, and (4) the destination is on the right." At this point, the driving directions merely indicate roads and maneuvers, and do not yet include lane-specific directions.

A lane within the final route segment $RS_N$ that provides a driver the best access to the destination is selected at block 210. To this end, lane data at least for the route determined at block 205 is retrieved from a database or received from a server. In the example of FIG. 2, because the destination 112 is situated on the right or north side of Pine, the right lane is selected within the route segment delimited by the intersection of Oak and Pine on one end and the destination on the other end.

According to the method 200, the route is then traversed backward from final route segment $RS_N$ to the first route segment $RS_1$ to identify suitable (recommended and/or route) lanes and lane connections. More specifically, a segment counter I is first set to N at block 215. For each new value of the segment counter I, lanes within the route segment $RS_{I-1}$ are evaluated and categorized based on access to previously graded lanes in route segment $RS_I$ (block 220). As an example, as illustrated in FIG. 2, navigation software selects and grades each lane of the Oak route segment (e.g., the segment of Oak between Elm and Pine) based on the access of each lane to lanes in the final route segment (e.g., the segment of Pine that is west of Oak). The right lane of the Oak route segment is graded more favorably for providing direct access to the right lane of Pine, previously selected at block 210. An example technique for grading lanes is discussed in more detail with reference to FIG. 7.

In one implementation, exactly one recommended lane can be selected for a road segment at block 220, with the recommended lanes connecting in a lawful manner at road junctions, so that the recommended lanes effectively define a recommended path within the route received at block 205. In another implementation, more than one recommended lane may be selected at some road segments.

At block 225, the segment counter I is decremented. If the segment counter is determined to be not yet equal to "1" at block 230 (i.e., if the countdown has not yet reached the first route segment), the flow proceeds back to the block 220 to select and grade the next route segment. On the other hand, if it is determined that the segment counter I is equal to "1," the flow proceeds to block 235, where lane-specific driving directions are generated based on the graded lanes of the traversed route segments.

For ease of illustration, it is assumed that lane data is available for each of the route segments $RS_1, RS_2, \ldots RS_N$. However, lane data may not always be available for every road segment of a route. According to one implementation, default lane configuration can be assigned to route segments for which actual lane data is missing (a single lane in the direction of travel for local streets, two lanes in the direction of travel for divided highways, etc.).

Further, to evaluate lane connections, lane data in some cases indicates not only lane connections between route segments but also lane connections to other roads or road segments at road junctions disposed along the route. For example, referring back to FIG. 2, the intersection of Oak and Pine includes lane connections that are not on-route, such as the right turn from the right lane of Oak, or the connection to the right lane on Oak that continues North past Pine.

The method 200 illustrates a linear traversal the sequence of route segments by way of example only. In other implementations, other approaches, including recursive techniques, can be used. For example, a recursive method for generating lane-specific driving directions can select a recommended lane from among a set of lanes S in the lane segment $RS_i$ based on which of these lanes connects to the recommended lane in the next lane segment $RS_{i+1}$, which is more proximate to the destination:

Recommended_lane($i$)=selected_connected_lane($S$, Recommended_lane($i$+1))

More generally, according to techniques of the present disclosure, a recommended lane is selected from a set of lanes at a route segment based not only on the legal restrictions on lanes in the set, such as "left only," but also on which one or several lanes are recommended in the next route segment on the way to the destination. Even more generally, any lane in a route segment can be graded in view of the grades assigned to the lanes of the next route segment on the way to the destination, for a particular route.

Figure 7:
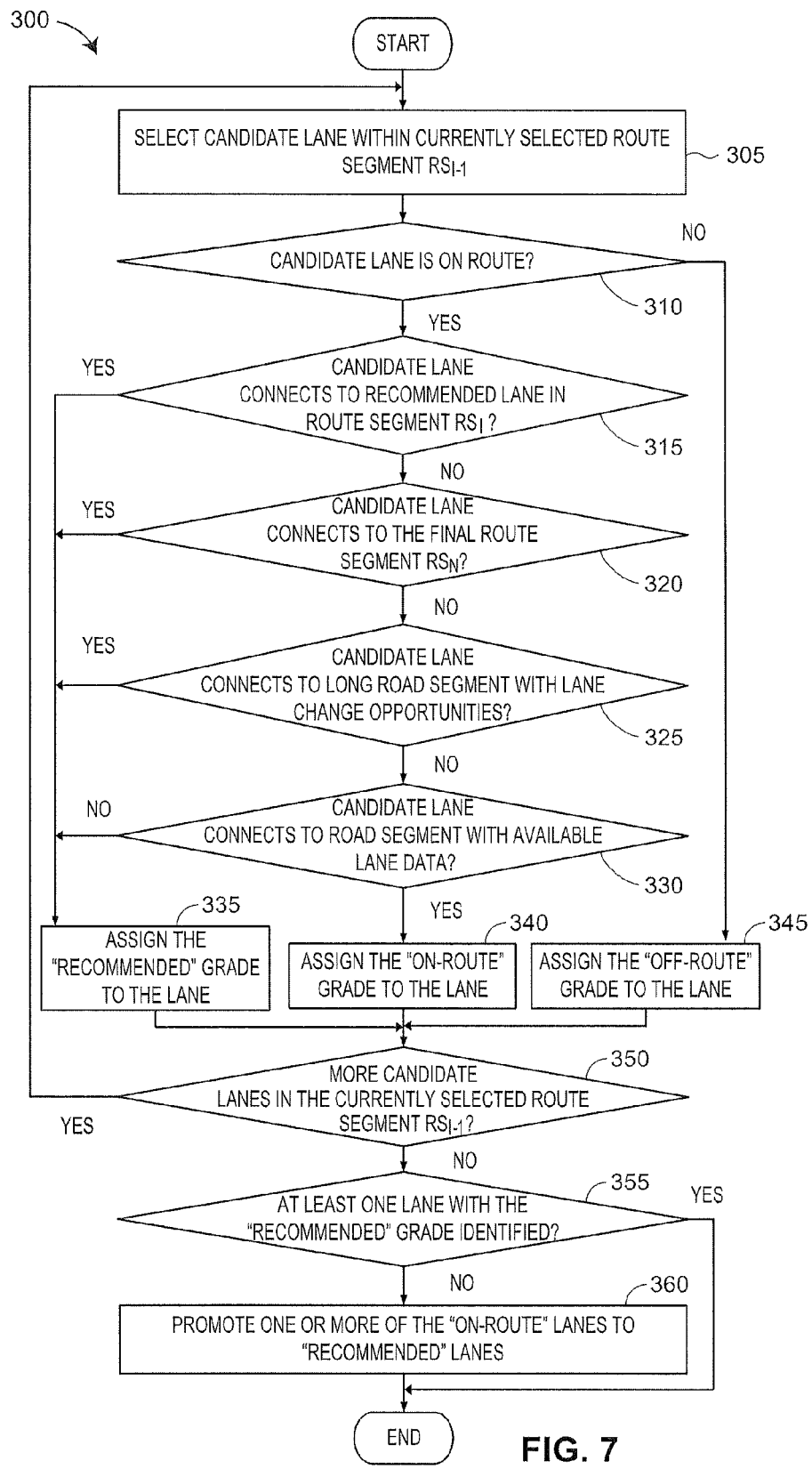
FIG. 7 is a flow diagram of an example method for "grading" one or more lanes for a route segment at a road junction situated along a driving route between a starting location and a destination location.

FIG. 7 is a flow diagram of an example method 300 for determining the grade or category of lanes within a particular selected route segment. More particularly, navigation software, such as the software running on the navigation server 14, may implement the method 300 to categorize a candidate lane into grades, such as the "recommended," "on-route," and "off-route," for example. The method 300 can be invoked, for example, at block 220 of the method 200 discussed above.

At block 305, a candidate lane is selected from all the lanes within the currently selected route segment $RS_{I-1}$ as discussed above, when lane data is available for the route segment $RS_{I-1}$. At block 310, the method 300 determines whether the selected candidate lane is on-route between an origin and a destination (e.g., the route between the starting location 110 and destination location 112 of FIG. 2.) If the candidate lane is determined to not be on route, the flow proceeds to block 345, and the lane is assigned an "off-route" grade. However, if the candidate lane is found to be on route, the method 300 determines whether the candidate lane connects to a recommended lane within the previously selected route segment $RS_I$ (block 315). For example, as shown in FIG. 2, if the right lane of the road segment of Oak between Elm and Pine was previously assigned a "recommended" grade, then the right lane of the road segment of Elm that is east of Oak is also assigned the "recommended" grade because the right lane of Elm directly connects to the right lane of Oak at the intersection of Elm and Oak. If the candidate lane connects to a recommended lane of the previously selected route segment $RS_I$, then the flow proceeds to block 335, and the candidate lane is assigned the "recommended" grade.

If the candidate lane does not connect to another recommended lane within a previous route segment $RS_I$, the method 300 determines whether the candidate lane connects to the final route segment $RS_N$, at block 320. Generally, the final route segment $RS_N$ includes the best access to the destination, and the candidate lane connecting to this final route segment $RS_N$ is assigned the "recommended" grade at the block 335. For example, when the precise location of the destination is unknown and the lane with the best access to the destination within the final route segment $RS_N$ cannot be determined, a lane within the currently selected route segment $RS_{I-1}$ may be assigned "recommended" at the block 335 when connecting to any lane of the final route segment $RS_N$ at block 320. However, in some implementations, a more demanding requirement that the candidate lane connect to the lane with the best access to the destination within the final route segment $RS_N$ may be instituted. For example, as shown in FIG. 2, if the right lane of the road segment of Pine (i.e., the final route segment) is determined to have the best access to the destination location 112, then the right lane of the road segment of Oak between Elm and Pine is assigned the "recommended" grade at the block 335 because the right lane of Oak connects with the right lane of Pine at the intersection of Pine and Oak. On the other hand, in the example of FIG. 2, the left lane of road segment of Pine does not have the best access to the destination location 112 and the left lane of Oak would not be assigned the "recommended" grade but rather the grade "on-route" because it does not connect with the lane having the best access to the destination location 112, despite connecting with the final route segment $RS_N$.

With continued reference of FIG. 7, if the candidate lane does not connect to the final route segment $RS_N$, the flow proceeds to block 325, where the method 300 determines whether the candidate lane connects to a sufficiently long road that provides lane change opportunities. The length of road between two road junctions may greatly affect the ability of the driver to change lanes easily, safely, and legally.

Generally, a longer road segment allows a driver to comfortably change lanes to position his or her car in the proper lane in preparation for the next maneuver. To illustrate the effect of the length of route segment on assigning a grade to a lane or lane connection, FIGS. 3 and 4 depict road segments of variable length. First referring back to FIG. 4, if distance y separating the on-ramp junction 172 and the off-ramp junction 174 is short, a driver entering the far right lane of highway at the on-ramp junction 172 may not have adequate time to change lanes to the left (so as to drive faster, for example) if the driver will need to exit the highway at highway off ramp junction 174 from the far right lane of the highway. In this case, the method 300 accounts for the short length of distance y at block 325 when determining the grades for the lanes in this route segment. The right lane (i.e., the highway route segment between the two junctions 172, 174 at the block 325, and accordingly, the far right lane of the highway route segment will be the only lane assigned the "recommended" grade at the block 335. Alternatively, if the distance y is long, the driver may have ample time to move into any of the other two lanes for some time before moving back into the far right lane to exit the highway. In this alternative case, all lanes of the highway route segment between the two road junctions 172, 174 may be assigned the "recommended" grade at the block 335.

Similarly, referring to FIG. 3, the method 300 may consider the distance x of the highway route segment between the two highway road junctions 152, 160 when assigning a grade to the two lanes of the highway route segment. If the distance x is short, the left lane may be assigned the "recommended" grade at the block 335 to instruct a driver entering the highway on the right lane from the highway on ramp road junction 152 to change into the left lane as soon as safely possible in order to exit the highway at highway off-ramp road junction 160. On the other hand, if the distance x is long, both the left and right lane of the highway route segment may be assigned the "recommended" grade at the block 335 to allow the driver to remain in either lane when first entering the highway from the highway on ramp yield road junction 152.

In any event, if the candidate lane does not connect to a long road segment with lane change opportunities, the method 300 determines whether the candidate lane connects to a road segment with available lane data (block 330). If the candidate lane connects to a road segment without lane data, a determination cannot be made in grading the candidate lane, and a default grade of "recommended" is assigned to the candidate lane in these circumstances at block 335. If the candidate lane connects to a road segment with available lane data, then the candidate lane is assigned the "on-route" grade at block 340. The blocks 310-330 may be performed in any order depending on particular configurations or implementations.

After the candidate lane is assigned a grade in one of the blocks 335-345, then the determination is made to whether any additional candidate lanes are within the current selected route segment $RS_{I-1}$ at block 350. If so, then at least some of the blocks 305-345 may be performed again for the newly selected candidate lane. If all lanes within the currently selected route $RS_{I-1}$ are assigned a grade, then a check is performed to determine whether at least one lane within the selected route $RS_{I-1}$ was assigned the "recommended" grade, at block 355. If none of the lanes received the "recommended" grade, one or more of the "on-route" lanes are promoted and assigned the "recommended" grade at block 360. This promotion of one or more of the "on-route" lanes may be determined in any number of manners.

For example, if none of the candidate lanes connects to a recommended lane in route segment $RS_I$, the candidate lane that connects to a lane next to, or closest to, the recommended lane in route segment $RS_I$ may be promoted and assigned the "recommended" grade, at block 360. As a more specific example, a two-lane one-way route segment $RS_{I-1}$ may only have one legal lane connection to a three-lane one-way route segment $RS_I$ (e.g., a right turn from the right lane of the two-lane segment to the right lane of the three-lane segment.) When the left lane of the three-lane route segment $RS_I$ is recommended, neither of the candidate lanes of two-lane route segment $RS_{I-1}$ initially will receive the "recommended" grade, and the candidate lane that connects to the lane closest to the recommended lane in three-lane route segment $RS_I$ will be promoted. It is noted that the lane closest to the recommended lane may not be immediately next to the recommended lane. In this example, because no candidate lane legally connects to the lane next to the recommended lane in the three-lane route segment $RS_I$ (i.e., the middle lane), the candidate lane that connects to the next closest lane to the recommended lane in three-lane route segment $RS_I$ is assigned the "recommended" grade. Thus, because the right candidate lane of the two-lane route segment $RS_{I-1}$ connects to the closest lane (i.e., the far right lane) to the recommended lane of the three-lane route segment $RS_I$, the right candidate lane is promoted and assigned the "recommended" grade.

It is noted that a lane may be graded using any number of grades. Furthermore, the example three-grade system described above, or a grading system with a larger number of grades, additionally may be based on the amount of time available to make a lane change, the number of lane changes required, the level of traffic congestion in a particular lane in accordance with real-time traffic data updates from the traffic server 16, etc. Moreover, a grading system may use a user-specific or system-specific data from the configuration data database 54. For example, if a user prefers certain types of roadways (i.e., preference for highways), avoiding tollways, etc., these types of user-specified data may be incorporated in assigned the grade as a weighted average, weighted scale, or any other suitable method.

Additional Considerations.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing an interface for generating lane-specific driving directions through the disclosed principles herein.

Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating lane-specific driving directions, the method comprising:
   receiving, by one or more processors, route data describing a route between an origin and a destination as a sequence of route segments;
   receiving lane data for at least several route segments included in the sequence of route segments,
   transversing, by the one or more processors, the sequence of route segments from the destination to the origin to consecutively select pairs of adjacent route segments, wherein each pair includes a route segment more proximate to the destination and a route segment more proximate to the origin; and
   for each pair including a first multi-lane segment more proximate to the destination and a second multi-lane route segment more proximate to the origin, connected at a road junction:
      selecting, by one or more processors, a lane in the first multi-lane route segment, and
      selecting, by the one or more processors, a lane in the second multi-lane route segment based on the lane selected in the first multi-lane segment to determine a recommended lane connection at the road junction.

2. The method of claim 1, wherein the lane data specifies, for each of the at least several route segments, (i) a respective number of lanes, and (ii) restrictions that apply to individual lanes in the route segment.

3. The method of claim 1, wherein selecting the lane in the first multi-lane route segment includes comparing, by the one or more processors, the selected lane to other lanes in the first multi-lane route segment to determine that the selected lane provides best access to one of (i) the destination, when the destination is disposed on the first multi-lane route segment, or (ii) an adjacent route segment that is more proximate to the destination than the first multi-lane route segment.

4. The method of claim 1, wherein selecting the lane within the second multi-lane segment is further based on restrictions that apply to individual lanes in the second multi-lane segment.

5. The method of claim 1, wherein selecting the lane within the second multi-lane segment is further based on whether a length of the second multi-lane segment provides lane change opportunities.

6. The method of claim 1, wherein:
   selecting the lane within the first multi-lane segment includes selecting exactly one lane as a recommended lane, and
   selecting the lane within the second multi-lane segment includes selecting exactly one lane as a recommended lane.

7. The method of 6, further comprising assigning a grade to each lanes in the second multi-lane route segment, including:
   assigning a recommended grade to the selected lane,
   assigning an on-route grade to each lane in the second multi-lane route segment from which a lane connection to the first route segment is available, and
   assigning an off-route grade to each lane in the second multi-lane route segment from which a lane connection to the first route segment is unavailable.

8. A method for evaluating lanes in multi-lane segments of routes described by driving directions, the method comprising:
   receiving a description of a route between an origin and a destination, wherein the route specifies a sequence of route segments connected at road junctions;
   receiving lane data for a multi-lane route segment included in the sequence of route segments, wherein the lane data indicates available lane connections for each of a plurality of lanes of the multi-lane route segment; and
   generating, by one or more processors, a respective grade for each of the plurality of lanes based on the description of the route and the lane data, including generating (i) a recommended grade for a first one of the plurality of lanes, (ii) an on-route grade to a second one of the plurality of lanes, and (iii) an off-route grade to a third one of the plurality of lanes.

9. The method of claim 8, wherein generating the respective grades further includes:
   determining, by the one or more processors, that both the first one of the plurality of lanes and the second one of the plurality of lanes are on route to the destination,
   determining, by the one or more processors, that driving in the first one of the plurality of lanes requires fewer maneuvers along the route to the destination than driving in the second one of the plurality of left lanes.

10. The method of claim 8, wherein generating the recommended grade for the first one of the plurality of the lanes is in response to determining, by the one or more processors, that the first one of the plurality of the lanes connects to a lane with the recommended grade in a next route segment in the sequence, wherein the next route segment in the sequence is multi-lane.

11. The method of claim 8, wherein generating the recommended grade for the first one of the plurality of the lanes is in response to determining, by the one or more processors, that (i) none of the plurality of the lanes connects to a lane with the recommended grade in a next route segment in the sequence, and (ii) the first one of the plurality of lanes connects to a lane positioned closest to the lane with the recommended grade in the next route segment, wherein the next route segment in the sequence is multi-lane.

12. The method of claim 8, wherein generating the recommended grade for the first one of the plurality of the lanes is in response to determining, by the one or more processors, that the first one of the plurality of the lanes connects to the last route segment in the sequence.

13. The method of claim 8, wherein generating the recommended grade for the first one of the plurality of the lanes is in response to determining, by the one or more processors, that the first one of the plurality of the lanes connects to a lane in a next route segment in the sequence that has sufficient length to provide a lane change opportunity.

14. A method for providing lane-specific driving directions via a user interface of a computing device, the method comprising:
   receiving, by one or more processors, route data describing a route between an origin and a destination as a sequence of route segments connected at road junctions;
   receiving, by the one or more processors, indications of grades assigned to lanes in multi-lane route segments included in the sequence, including receiving (i) a recommended grade assigned to a first lane, (ii) an on-route grade assigned to a second lane, and (iii) an off-route grade assigned to a third lane; and providing lane-specific driving directions including indications of route segments and the indications of grades via the user interface.

15. The method of claim 14, wherein:
both the first lane and the second lane are in a same multi-lane route segment, and
driving in the first lane allows requires fewer maneuvers along the route to the destination than driving in the second lane.

16. The method of claim 14, wherein the first lane, the second lane, and the third lane are in a same multi-lane segment included in the sequence.

17. The method of claim 14, further comprising indications of grades assigned to lane connections in the road junctions, including receiving (i) the recommended grade assigned to a first lane connection, (ii) the on-route grade assigned to a second lane connection, and (iii) the off-route grade assigned to a third lane connection.

18. The method of claim 17, further comprising generating arrows for display via the user interface to illustrate the lane connections, including generating (i) arrows having a first visual style to illustrate lane connections with the recommended grade, (ii) arrows having a second visual style to illustrate lane connections with the on-route grade, and (iii) arrows having a third visual style to illustrate lane connections with the off-route grade.

19. A method for evaluating lane connections for multi-lane segments of routes to provide lane-specific driving directions, the method comprising:

receiving, by one or more processors, a description of a route between an origin and a destination, wherein the route includes a sequence of route segments connected at road junctions;

receiving, by the one or more processors, road junction data for one of the road junctions at which a multi-lane route segment is connected to two or more roads, wherein the road junction data indicates a plurality of lane connections between lanes of the multi-lane route segment and the two or more roads; and generating, by the one or more processors, a respective grade for each of the plurality of lane connections based on the description of the route and the road junction data, including generating (i) a recommended grade for a first one of the plurality of lane connections, (ii) an on-route grade to a second one of the plurality of lane connections, and (iii) an off-route grade to a third one of the plurality of lane connections.

20. The method of claim 19, wherein the multi-lane route segment is a first multi-lane route segment, and wherein generating the recommended grade to the first one of the plurality of lane connections is in response to determining that the first one of the plurality of lane connections is between a first lane in the first multi-lane route segment and a second lane in a second multi-lane route segment, wherein the second multi-lane route segment is closer to the destination, and wherein the second lane is on a lane-specific recommended path to the destination.

* * * * *